(12) United States Patent
Hwang et al.

(10) Patent No.: US 7,481,732 B2
(45) Date of Patent: Jan. 27, 2009

(54) POWER TRAIN FOR HYBRID VEHICLE

(75) Inventors: Kyung-Won Hwang, Uijeongbu-si (KR); Soo-Hoon Kim, Yangju-si (KR)

(73) Assignee: Hyundai Motor Company, Seoul (KR)

( * ) Notice: Subject to any disclaimer, the term of this patent is extended or adjusted under 35 U.S.C. 154(b) by 181 days.

(21) Appl. No.: 11/591,897

(22) Filed: Nov. 2, 2006

(65) Prior Publication Data
US 2008/0039260 A1 Feb. 14, 2008

(30) Foreign Application Priority Data
Aug. 10, 2006 (KR) ............ 10-2006-0075542

(51) Int. Cl.
*B60K 6/20* (2007.10)
(52) U.S. Cl. .......................................... 475/5
(58) Field of Classification Search ............. 475/5, 475/149, 151
See application file for complete search history.

(56) References Cited

U.S. PATENT DOCUMENTS

| 2006/0063629 A1* | 3/2006 | Minagawa et al. ............. 475/5 |
| 2007/0149334 A1* | 6/2007 | Holmes et al. ................. 475/5 |

FOREIGN PATENT DOCUMENTS

| JP | 09-226392 | 9/1997 |
| JP | 10-081148 | 3/1998 |
| JP | 2000-069608 | 3/2000 |
| JP | 2000-142139 | 5/2000 |
| JP | 2000-142146 | 5/2000 |
| JP | 2003-111205 | 4/2003 |
| JP | 2003-247613 | 9/2003 |
| JP | 2004-012583 | 1/2004 |
| JP | 2004-032934 | 1/2004 |
| JP | 2004-114945 | 4/2004 |
| JP | 2004-306951 | 11/2004 |
| JP | 2005-147319 | 6/2005 |

* cited by examiner

*Primary Examiner*—Sherry L Estremsky
*Assistant Examiner*—Edwin A Young
(74) *Attorney, Agent, or Firm*—Morgan, Lewis & Bockius LLP

(57) ABSTRACT

A power train for a hybrid vehicle includes an outer rotor-typed generator motor, disposed adjacent to an engine and concentric with an output shaft of the engine; a first planetary gear set including a sun gear provided to an outer rotor of the generator motor, carriers connected with the output shaft of the engine, and a ring gear; a driving motor, disposed opposite the engine with respect to the generator motor and concentric with the output shaft of the engine; a second planetary gear set including a sun gear, carriers, and a ring gear, one of which is connected to the driving motor, another of which is fixed, and the other of which is connected to the first planetary gear set; and a PTO (Power Take Off), which receives power from the ring gear of the first planetary gear set and transmits the power to a differential.

6 Claims, 2 Drawing Sheets

POWER TRAIN FOR HYBRID VEHICLE

CROSS-REFERENCE TO RELATED APPLICATIONS

The present application is based on, and claims priority from, Korean Application Serial Number 10-2006-0075542, filed on Aug. 10, 2006, the disclosure of which is hereby incorporated by reference herein in its entirety.

FIELD OF THE INVENTION

The present invention relates to a power train for a hybrid vehicle, particularly, a power train for a hybrid vehicle that includes an outer rotor-typed generator motor, a first planetary gear set, a second planetary gear set, and a PTO (Power Take Off), which receives power from a ring gear of the first planetary gear set and transmits the power to a differential.

BACKGROUND OF THE INVENTION

A power train for hybrid vehicles typically includes a generator motor and a driving motor, each concentric with an input shaft, which receives power from an engine. A planetary gear set is disposed between the engine and the generator motor on one side, and the driving motor on the other side. Power is received from a ring gear of the planetary gear set and transmitted to a differential through a chain.

The generator motor is connected to a sun gear of the planetary gear set. The driving motor is connected to the ring gear. Carriers are connected to the engine.

The generator motor mainly starts the engine and generates electricity and the driving motor supports starting of the vehicle and power of engine.

When the vehicle starts, it is preferable to use a motor with excellent torque efficiency. Because the driving motor is connected to the ring gear, the capacity of the driving motor should be large to output sufficient driving force for the vehicle.

However, the large capacity of the driving motor in the configuration set forth above makes the power train too long and difficult to mount in a vehicle.

SUMMARY OF THE INVENTION

Embodiments of the present invention provide a power train for a hybrid vehicle. Because torque provided by a driving motor is sufficient using a planetary gear set without increasing volume of the driving motor, the vehicle shows smooth drive characteristics. In addition, the length and volume of the power train as a whole are small.

A power train for a hybrid vehicle according to an embodiment of the invention includes an outer rotor-typed generator motor, a first planetary gear set, a driving motor, a second planetary gear set, and a PTO (Power Take Off). The outer rotor-typed generator motor is disposed adjacent to an engine and concentric with an output shaft of the engine. The first planetary gear set includes a sun gear provided to an outer rotor of the generator motor, carriers connected with the output shaft of the engine, and a ring gear. The driving motor is disposed opposite the engine with respect to the generator motor and concentric with the output shaft of the engine. The second planetary gear set includes elements of a sun gear, carriers, and a ring gear. One of these elements is connected to the driving motor, another is fixed, and the other is connected to the first planetary gear set. The PTO (Power Take Off) receives power from the ring gear of the first planetary gear set and transmits the power to a differential.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
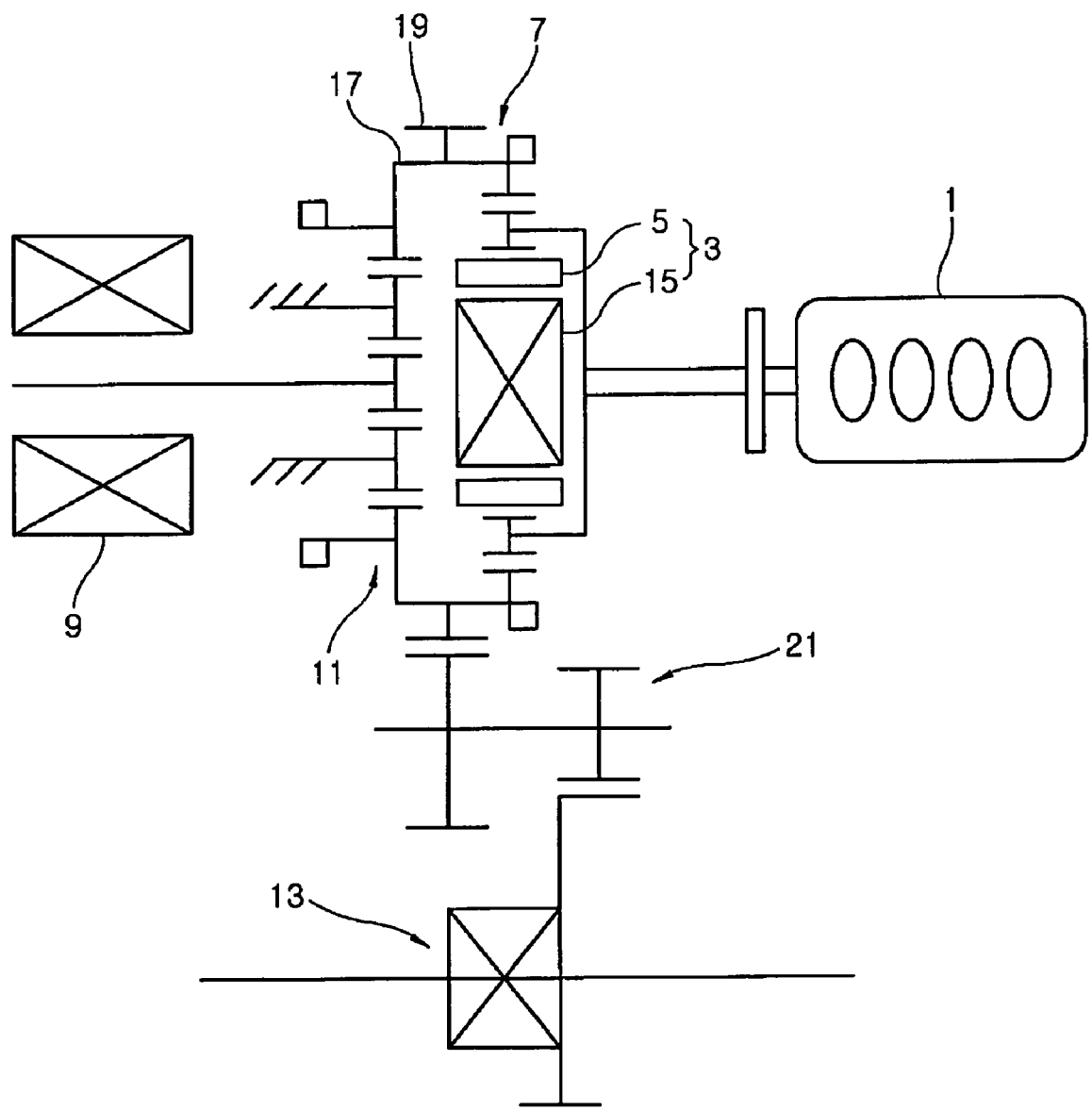
FIG. 1 is a view illustrating a power train for a hybrid vehicle according to a first exemplary embodiment of the invention.

Exemplary embodiments of the invention are described hereafter with reference to the accompanying drawings.

A power train of an exemplary embodiment of the present invention includes: an outer rotor-typed generator motor 3 that is disposed adjacent to an engine 1 concentric with an output shaft of an engine 1; a first planetary gear set 7 that includes a sun gear provided to an outer rotor 5 of generator motor 3, carriers connected with the output shaft of engine 1, and a ring gear; a driving motor 9 that is disposed opposite engine 1 concentric with the output shaft of engine 1; a second planetary gear set 11 that includes a sun gear, carriers, and a ring gear, of which one is connected with driving motor 9, another is fixed, and the other is connected with first planetary gear set 7; and a PTO (Power Take Off) that receives power from the ring gear of first planetary gear set 7 and transmits it to a differential 13. The PTO will be described in more detail below.

Generator motor 3 is an outer rotor-typed motor that has a stator 15 at the center and a rotor outside stator 15. Outer rotor 5 includes the sun gear of first planetary gear set 7 at its circumference and makes up a part of first planetary gear set 7.

In second planetary gear set 11, the sun gear is connected with driving motor 9, the carriers are fixed, and the ring gear is connected with the ring gear of first planetary gear set 7 by an integration ring 17.

The PTO differs in the two exemplary embodiments of FIGS. 1 and 2 as set forth below.

A PTO in the power train of FIG. 1 includes an external gear 19 disposed on the circumference of integration ring 17; and a connecting gear unit 21 of which a driving gear at one side is engaged with external gear 19 and a driven gear at the other side is engaged with a ring gear of differential 13.

Figure 2:
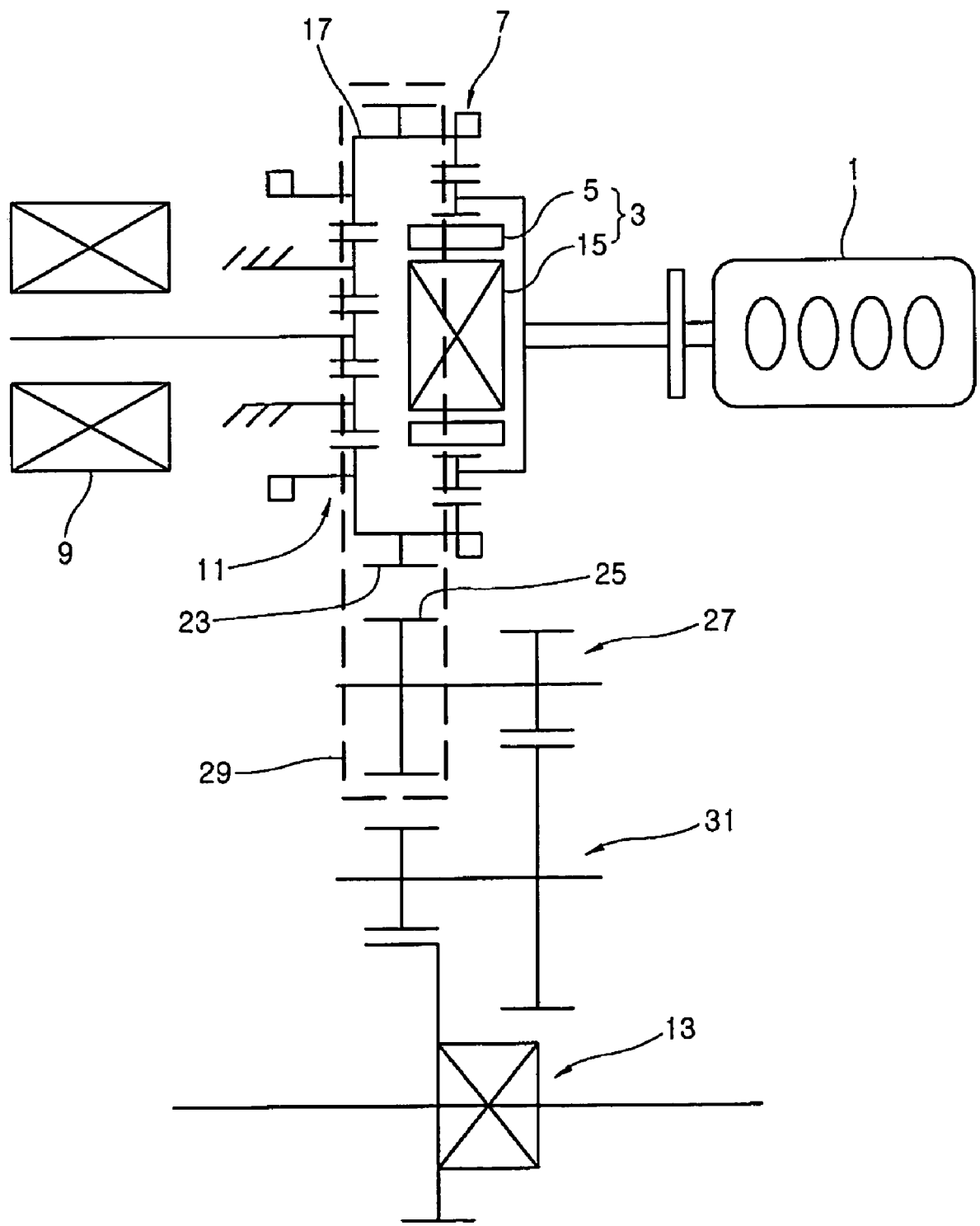
FIG. 2 is a view illustrating a power train for a hybrid vehicle according to a second exemplary embodiment of the invention.

In contrast, a PTO in the embodiment of FIG. 2 includes a driving sprocket 23 that is disposed on the circumference of integration ring 17; an intermediate transmitting unit 27 that has a driven sprocket 25, which is linked with driving sprocket 23, at one end, and a driven gear at the other end; a chain 29 that links driving sprocket 23 and driven sprocket 25; and an idler gear unit 31 that changes the rotational direction of the driven gear of intermediate transmitting unit 27 and transmits power to differential 13.

The configuration of FIG. 2, as compared with the configuration of FIG. 1, freely changes the distance from intermediate transmitting unit 27, which has a separate shaft parallel to the output shaft of engine 1, to the rotational shaft of integration ring 17 and the output shaft of engine 1. Idler gear unit 31 changes the rotational direction accordingly.

Generator motor 3 mainly generates electricity to charge a battery that drives driving motor 9. Further, because generator motor 3 is an outer rotor 5 type and first planetary gear. set 7 uses outer rotor 5 as a sun gear, the power train has a small volume, as compared with those in the related art. In addition, generator motor 3 has a large capacity as compared with those in the related art.

Driving motor 9 improves fuel efficiency by allowing a vehicle to travel in an electric car mode after initial starting. As described above, driving motor 9 supports driving force of engine 1, so that it improves acceleration of the vehicle and allows the vehicle to cope with a large amount of load.

The output from driving motor 9 is decelerated by second planetary gear set 11 so as to be supplied in a state in which torque is increased; therefore, driving motor 9 is capable of providing sufficient output torque required for a hybrid vehicle without increasing size, which improves the mounting efficiency in a vehicle.

Because torque provided by a driving motor is sufficiently secured using a planetary gear set without increasing volume of the driving motor, a hybrid vehicle can perform smooth drive characteristics. In addition, the entire length and volume is not increased, thus good mounting efficiency of the power train can be achieved.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power train for a hybrid vehicle, comprising:
   an outer rotor-typed generator motor disposed adjacent to an engine and substantially concentric with an output shaft of the engine;
   a first planetary gear set comprising a sun gear disposed on an outer rotor of the generator motor, carriers connected to the output shaft of the engine, and a ring gear;
   a driving motor disposed opposite the engine with respect to the generator motor and substantially concentric with the output shaft of the engine;
   a second planetary gear set comprising elements including a sun gear, carriers, and a ring gear, wherein a first element is connected to the driving motor, a second element is fixed to a stationary member, and a third element is connected to the first planetary gear set; and
   a power take off that receives power from the ring gear of the first planetary gear set and transmits the power to a differential.

2. The power train as defined in claim 1, wherein the first element is the sun gear of the second planetary gear set, the second element is the carriers of the second planetary gear set, and the third element is the ring gear of the second planetary gear set.

3. The power train as defined in claim 2, wherein the ring gear of the second planetary gear set is connected to the ring gear of the first planetary gear set with an integration ring.

4. The power train as defined in claim 3, wherein the power take off comprises:
   an external gear disposed on an edge of the integration ring; and
   a connecting gear unit comprising a driving gear, disposed at a first end and engaged with the external gear, and a driven gear, disposed at a second end and connected to a ring gear of the differential.

5. The power train as defined in claim 3, wherein the power take off comprises:
   a driving sprocket disposed on an edge of the integration ring;
   an intermediate transmitting unit comprising a driven sprocket, which is connected with the driving sprocket, disposed at a first end, and a driven gear disposed at a second end;
   a chain that links the driving sprocket and the driven sprocket; and
   an idler gear unit that changes a rotational direction of the driven gear of the intermediate transmitting unit and transmits power to the differential.

6. The power train as defined in claim 1, wherein the stationary member is a transmission housing.

* * * * *